Sept. 23, 1947.    J. NAYMIK    2,427,735
SOLENOID STEERING SYSTEM FOR DIRIGIBLE CRAFT
Filed Nov. 28, 1945    2 Sheets-Sheet 2

INVENTOR
Joseph Naymik.
BY
Paul E. Friedemann
ATTORNEY

Patented Sept. 23, 1947

2,427,735

UNITED STATES PATENT OFFICE 2,427,735

SOLENOID STEERING SYSTEM FOR DIRIGIBLE CRAFT

Joseph Naymik, Sharon, Pa., assignor to Westinghouse Electric Corporation, East Pittsburgh, Pa., a corporation of Pennsylvania Application November 28, 1945, Serial No. 631,396

5 Claims. (Cl. 114—23)

This invention relates generally to electrically controlled conveyances which operate in a fluid medium, and more particularly to a specific electric system of control for torpedoes embodying electromagnetic operators for actuating the movable control surfaces of the torpedo.

One object of this invention is to provide a system of electrical control for a torpedo which is simple in its elements and positive in operation.

Another object of this invention is to provide a system for controlling the movable control surfaces of a torpedo which is quickly and accurately responsive to the control forces applied thereto.

Still another object of this invention is to provide a control arrangement for the movable surfaces of a torpedo in which means are provided for applying equal actuating forces to diametrically oppositely disposed portions of the yokes or crank arms which drive the torque tubes or rods connected to the control surfaces.

A specific object of this invention is to provide a control arrangement for controlling the movable control surfaces of a torpedo which includes a plurality of solenoids mechanically connected to drive said control surfaces, each solenoid including a pair of magnetizing coils and each being arranged to effect actuation of the solenoid plunger in two directions depending upon which of the two coils is energized.

A further object of this invention is to provide an electrical control system for controlling the energization of the solenoids of the control arrangement as stated in the preceding object in accordance with and in dependence of predetermined control conditions.

The foregoing objects are merely illustrative of the various aims and objects of this invention. Other objects and advantages will become apparent upon a study of the following specification when considered in conjunction with the accompanying drawing, in which.

Figure 1:
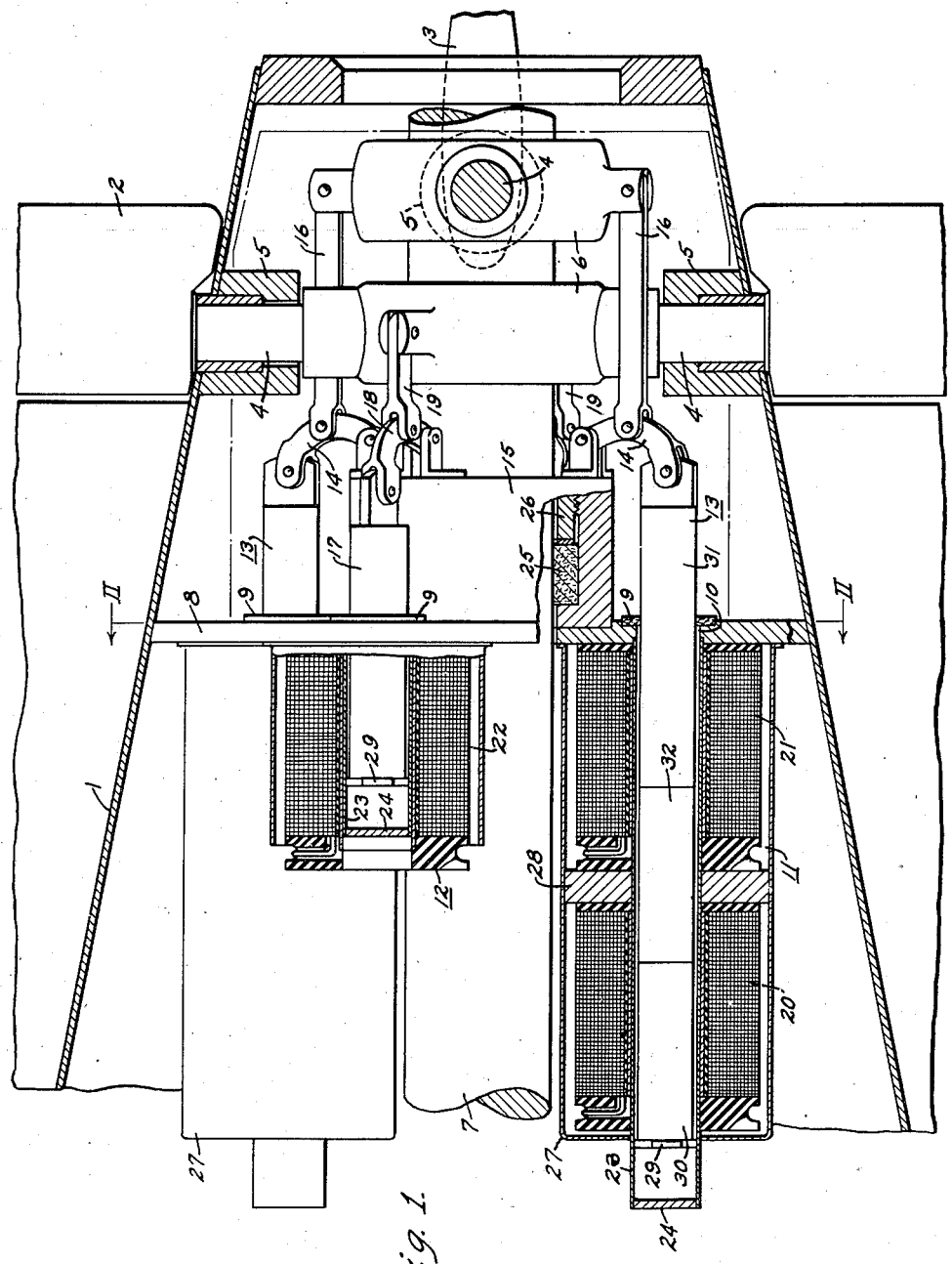
Figure 1 is a longitudinal sectional view of the tail-cone of a torpedo illustrating the mechanical arrangement, in one form of embodiment, of the control elements of this invention.
Figure 2:
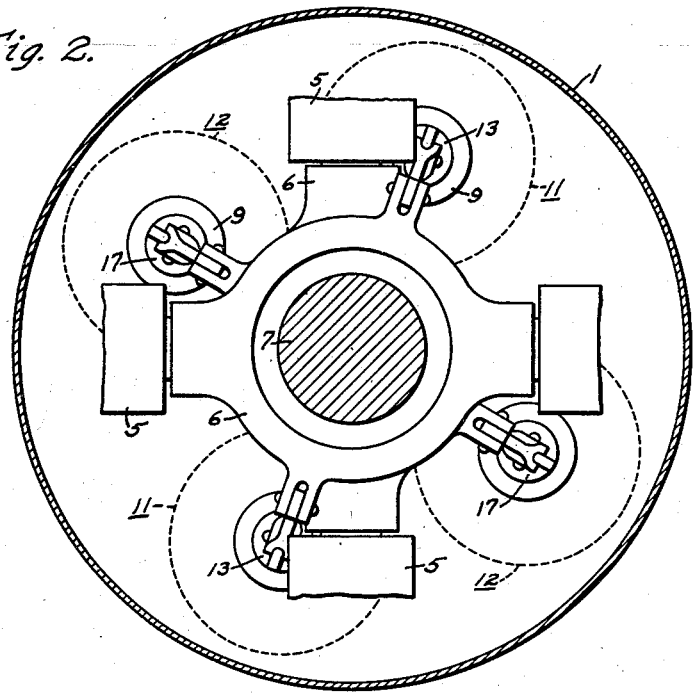
Fig. 2 is a sectional view taken on the line II—II of Fig. 1, and illustrates the mechanical arrangement of the control elements of this invention as viewed from a position aft of the torpedo looking forward.

Referring now to Figs. 1 and 2, there is illustrated the tail-cone 1 of a torpedo to which the movable control surfaces for directional and depth control are attached. The entire control assembly is housed within the torpedo body 1', which is usually a fabricated sheet metal structure assembled in sections. In the present instance numerous structural details of the body proper have been eliminated, since, per se, they form no part of this invention. Directional control of the torpedo is afforded by the rudders 2 while control of the depth of operation of the torpedo is had by the elevators 3 shown in broken outline. These movable control surfaces are secured to torque tubes or rods 4 which are pivoted in bearings 5 supported by the torpedo body, internally thereof, the movable components of the rudder and elevator assembly being respectively located on diametrically opposite sides of the torpedo body and being each connected for movement as a unit through the medium of the rocker rings 6 which encircle the concentrically disposed torpedo propulsion shaft 7.

The solenoids which actuate the rocker rings connected to the elevators and rudders are mounted on the forward side of the bulkhead 8 and the plungers thereof project through gaskets 9 seated in recesses concentrically of the openings 10 in the bulkhead. As will be seen from Fig. 2, the solenoids are arranged in diametrically disposed pairs, the pair designated 11 actuating the elevators 3 and the pair designated 12 actuating the rudders 2. This is accomplished in the case of the elevators 3 by connecting each of the plungers 13 of solenoids 11 to a link 14 pivoted at its innermost extremity to the boss 15 and pivotally connecting a link 16 along a portion of each link 14 at a point removed from the point of pivoting thereof on the boss 15, whereby any suitable proportion of the movement of solenoid plunger 13 is imparted to the links 16. The remaining extremities of links 16 are pivotally attached at diametrically disposed points to the rocker ring 6 which drives the elevators 3. Movement of the plungers 13 thus effects tilting of the elevator rocker ring causing the elevators 3 to move angularly with respect to the longitudinal axis of the torpedo. Rudders 2 are similarly connected to be angularly deflected upon movement of the plungers 17 by means of the diametrically disposed link systems, each of which include the links 18 and 19.

The structure of the solenoids is best seen in Figure 1 wherein one of the solenoids 11 and one of the solenoids 12 are illustrated in section. It will be observed that solenoid 11 comprises two magnetizing coils 20 and 21 which are arranged in tandem and are preferably identical, and that solenoid 12 comprises a single magnetizing coil 22. The provision of single coil solenoids, one for actuating the rudder in each of its two directions of movement, that is, port and starboard, from neutral position is conventional. In contradistinction to this, this invention provides the pair of two coil solenoids arranged to simultaneously exert pushing and pulling forces on the elevator rocker ring 6 through the link system including the links 14 and 16. While not so illustrated, it is to be understood that the application of the two coil solenoids and the resulting push-pull control is contemplated in connection with the operation of rudders 2.

Each of the solenoids 11 is assembled about a tube 23, which, for the instant application, is stainless steel. This tube is fitted into a counterbored recess in the forward side of bulkhead 8 where it is suitably secured to form a watertight joint as by welding or brazing, and the forward extremity of the tube is sealed by the plug 24. This expedient prevents the passage of sea water through the solenoids from the after control element section into the forward torpedo compartments. This expedient is also practiced in the single coil solenoids as illustrated. Water passage past the bulkhead 8 around the shaft 7 is minimized by the packing 25 and nut 26 located within the boss 15. Coils 20 and 21 are insulatedly arranged about the tube 23 and the magnetic circuits therefor include the housing 27, the plate 28 disposed between the coils in contact with the housing and the bulkhead 8, all of which are composed of material capable of conducting magnetic flux. The magnetic circuits for each of the magnetizing coils may be, but need not essentially be, of the same reluctance in the absence of the plunger 13 or with the plunger centralized between the coils.

Tube 23 is of sufficient diameter to provide operating clearance for plunger 13 and the plunger is supported substantially concentrically of the tube by the washer or gasket 9 and spacer 29 at the forward extremity of the plunger. Plunger 13 comprises two distinct plunger elements 30 and 31 of magnetic material. These elements are axially spaced and separated by the nonmagnetic section 32 and the elements 30 and 31 are so arranged with respect to their respective coils 20 and 21 that energization of coil 20 exerts a thrust to the right on plunger assembly 13, while energization of coil 21 exerts a thrust to the left thereon as seen in Fig. 1. The specific plunger structure described may be modified by making the sections 30 and 31 of nonmagnetic material and the section 32 of magnetic material. The size proportion of the various plunger elements may be modified to suit specific conditions.

Thus, by means of the diametrically disposed pair of solenoids 11, it is possible by proper energization of the magnetizing coils thereof, to cause opposite movement of the plungers 13 of the respective solenoids and, as follows, to apply cumulative, balanced rotational forces to opposite sides of the rocker ring or yoke 6 which actuates the elevators 3.

Figure 3:
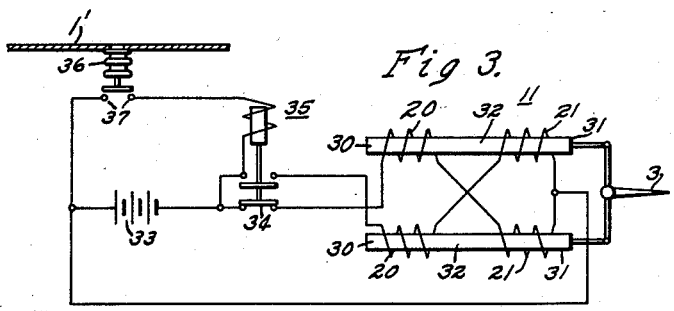
Fig. 3 is a diagrammatic showing of the present system of control for the torpedo.

A simplified control arrangement whereby the solenoids 11 may be energized in dependence of the depth of the torpedo and thus operated to control the average depth at which the torpedo is to travel is illustrated in Fig. 3. It is to be understood that the control circuit of Fig. 3 includes only the basic elements necessary to provide depth responsive control, other elements constituting refinements in the circuit illustrated and sometimes included in such control schemes, having been eliminated in the interest of simplicity.

As illustrated, the coils of the respective solenoids are connected in series circuit relation in diagonally opposite pairs, although the diagonally opposite pairs of coils may equally well be connected in parallel circuit relation, a coil 20 of one solenoid being connected in series with a coil 21 of the other solenoid. The pair of series coil circuits thus formed are connected in parallel with the battery 33 and each series circuit is broken through one of the contacts of the transfer contact set 34 of relay 35. Energization of relay 35 is controlled by a pressure responsive switch including the bellows 36 arranged in the torpedo body 1 to be subjected to the pressure of the surrounding fluid medium and which controls the opening and closing of contacts 37 in series in the coil circuit of relay 35.

When the contacts 37 of the pressure switch are open, the back contacts of transfer contacts 34 are closed causing movement of the upper solenoid plunger to the right and movement of the lower solenoid plunger to the left, deflecting elevators 3 down and causing the torpedo to dive. As the torpedo depth reaches the predetermined maximum, the pressure switch closes contacts 37, for the reason that bellows 36 are extended by the increased fluid pressure and the coil of relay 35 is connected across the battery. Relay 35 picks up closing the front contacts of the transfer contacts 34 and the movements of plungers 13 are reversed deflecting the elevators 33 upwardly. The resulting path of the torpedo in the vertical direction may be described as approximately sinusoidal, about the average depth of operation and is essentially a pressure responsive hard-over to hard-over depth control. The control by reason of its simplicity and the cumulative balanced torques acting on the control surface torque rods, which results in a minimum of lateral loading of the torque rods, and as a consequence provides free movements of the torque rods in the bearings therefor, accurately controls the torpedo in response to the varying operating pressures.

The foregoing disclosure and the showings made in the drawings are merely illustrative of the principles of this invention, and are not to be interpreted in a limiting sense. The only limitations are to be determined from the scope of the appended claims.

I claim as my invention:

1. In apparatus for operating a control surface for a craft moving through a fluid medium, the combination of, a control surface mounted to have angular movement with reference to the longitudinal axis of the crank, a crank arm mechanically connected to said control surface to angularly deflect said control surface, said crank arm being symmetrical with respect to the axis of rotation thereof, a pair of solenoids each having two magnetizing coils and a plunger assembly constructed and arranged to move in one direction when one magnetizing coil is energized and to move in the opposite direction when the other magnetizing coil is energized, means mechanically connecting each of said plungers to said crank arm so that the plungers are connected to diametrically opposite sides of said crank arm, and means for energizing the magnetizing coils of said solenoids so that the forces applied to said crank arm by the solenoid plungers are cumulative.

2. In apparatus for operating a control surface for a craft moving through a fluid medium, the combination of, a control surface mounted to have angular movement with reference to the longitudinal axis of the craft, a crank arm mechanically connected to said control surface to angularly deflect said control surface, said crank arm being symmetrical with respect to the axis of rotation thereof, a pair of solenoids each having two magnetizing coils disposed in coaxial relation and a plunger assembly constructed and arranged to move in one direction when one magnetizing coil is energized and to move in the opposite direction when the other magnetizing coil is energized, link means connecting the solenoid plungers to said crank arm so that the solenoid plungers are connected to diametrically opposite sides of said crank arm, and means for energizing the magnetizing coils so that the forces applied to said crank arm to effect rotation thereof are cumulative.

3. A control assembly for a torpedo having a shell-like body comprising, in combination, a control surface for said torpedo, a bearing in said torpedo body, a torque rod for moving said control surface, pivotally mounted in said bearing and projecting therethrough into said torpedo body; a crank arm mechanically connected to said torque rod within said torpedo body, said crank arm being symmetrical with respect to the axis of rotation thereof, a bulkhead disposed within said torpedo body and having a sealed connection therewith, said bulkhead having a pair of diametrically oppositely disposed openings therein, a pair of tubes of nonmagnetic material each having one end thereof sealed, each tube having the open end thereof sealed in one of said openings, a pair of magnetizing coils coaxially disposed about each of said tubes, a pair of plunger assemblies each comprising a pair of coaxially disposed elements of magnetic material separated by a nonmagnetic insert and mechanically joined together, each plunger assembly being disposed in one of said tubes for axial movement therein, the magnetic elements of each plunger assembly being each magnetically associated with one of the coaxially disposed magnetizing coils in that solenoid, and means connecting said plungers to diametrically opposite portions of said crank arm.

4. In apparatus for operating a control surface for a craft moving through a fluid medium, the combination of, a control surface mounted to have angular movement with reference to the longitudinal axis of the crank, a crank arm mechanically connected to said control surface to angularly deflect said control surface, said crank arm being symmetrical with respect to the axis of rotation thereof, a pair of solenoids each having two magnetizing coils and a plunger assembly constructed and arranged to move in one direction when one magnetizing coil is energized and to move in the opposite direction when the other magnetizing coil is energized, circuit means connecting a coil of one solenoid, which effects movement of the plunger thereof in one direction, with a coil of the other solenoid, which effects movement of the plunger of said other solenoid in the opposite direction, to form two separate pairs of coil circuits; means mechanically connecting each of said plungers to said crank arm so that the plungers are connected to diametrically opposite sides of said crank arm, and means for selectively energizing said pair of coil circuits.

5. A control assembly for a torpedo having a shell-like body comprising, in combination, a control surface for said torpedo, a bearing in said torpedo body, a torque rod for moving said control surface, pivotally mounted in said bearing and projecting therethrough into said torpedo body; a crank arm mechanically connected to said torque rod within said torpedo body, said crank arm being symmetrical with respect to the axis of rotation thereof, a bulkhead disposed within said torpedo body and having a sealed connection therewith, said bulkhead having a pair of diametrically oppositely disposed openings therein, a pair of tubes of nonmagnetic material each having one end thereof sealed, each tube having the open end thereof sealed in one of said openings, a pair of magnetizing coils coaxially disposed about each of said tubes, a pair of electrical circuits each connecting the diagonally opposite coils of the respective solenoids, a pair of plunger assemblies each comprising a pair of coaxially disposed elements of magnetic material separated by a nonmagnetic insert and mechanically joined together, each plunger assembly being disposed in one of said tubes for axial movement therein, the magnetic elements of each plunger assembly being each magnetically associated with one of the coaxially disposed magnetizing coils in that solenoid, and means connecting said plungers to diametrically opposite portions of said crank arm, and means for selectively energizing said pair of electrical circuits.

JOSEPH NAYMIK.